3,773,851
VAPOR PHASE ISOPRENE PROCESS
John O. Turner, West Chester, Pa., assignor to Sun
Research and Development Co., Marcus Hook, Pa.
No Drawing. Filed Apr. 17, 1972, Ser. No. 244,917
Int. Cl. C07c 1/20
U.S. Cl. 260—681                                   9 Claims

ABSTRACT OF THE DISCLOSURE

Isoprene may be prepared in one step by reacting methylal with isobutene or butene-2 in the vapor phase in the presence of a catalyst comprising boron phosphate. The use of this catalyst provides good yields and selectivities together with reduced amounts of isoprene precursors when compared to other vapor phase processes.

BACKGROUND OF THE INVENTION

This invention relates to an improved process for the production of isoprene. More particularly, this process is directed to the vapor phase reaction of methylal with isobutene or butene-2 in the presence of boron phosphate catalyst to provide isoprene in good yields and selectivity. In a further embodiment, this invention also contemplates the use of metal salt co-catalysts which convert certain ether by-products to isoprene, thereby increasing the overall yield.

Japanese Pat. No. 45/19,082, published Aug. 27, 1970, in the name of K. Kitawaki et al., and assigned to Idenitsu K. K., describes a vapor phase reaction of methylal with isobutene to form isoprene and isoprene precursors wherein the catalyst employed is silica, alumina, acid clay, Group II or Group III metal oxides, or mixtures thereof with silica, alumina or the like, etc. This process, while it does produce isoprene, is nevertheless characterized by very short catalyst lifetimes. Moreover, as shown in Example 1 below, the selectivity and conversion rate drop substantially after about 15 to 30 minutes when employing this prior art method.

In earlier filed co-pending application, Ser. No. 197,964 filed Nov. 11, 1971, now abandoned, in the name of John O. Turner, there is described a one-step vapor phase process wherein methylal is reacted with isobutene in the presence of a catalyst comprising $BF_3$ on alumina. This process is characterized by significantly higher yields of isoprene and longer catalyst lifetimes than the corresponding Japanese method. The product mixture does contain however, significant amounts of the isoprene precursor, 4-methoxy-2-methylbutene-1 which must then further be converted to isoprene.

SUMMARY OF THE INVENTION

It has now been found, in accordance with the present invention, that when boron phosphate is employed as the catalyst in the process of reacting methylal with isobutene or butene-2 to form isoprene, there are obtained high conversion rates and selectivity to isoprene accompanied by the formation of only relatively small amounts of 4-methoxy-2-methylbutene-1 precursor.

DESCRIPTION OF THE INVENTION

In accordance with the present process, the reaction of methylal with isobutene in the vapor phase is conveniently carried out by passing the two reactants over a catalyst bed at elevated temperatures of from 150 to 450° C., and preferably 250 to 350° C., at liquid hourly space velocities (LHSV) for the reaction mixture in the range of from about 0.1 to 25.0, and preferably 1.0 to 10.0, and recovering a product mixture containing isoprene, small amounts of the isoprene precursor, 4-methoxy-2-methylbutene-1, and some high-boiling by-products. The isoprene may readily be recovered from this mixture by distillation.

The mole ratio of isobutene to methylal in the feed stream should advantageously be in the range of from about 2 to 20, and preferably about 6 to 10. Thus, although it is important that there be an excess of isobutene over methylal, a much smaller excess is necessary than is required by the Japanese prior art method, where ratios of at least fifteen are employed.

Although substantially pure isoprene is the preferred olefin reactant, other olefins such as butene-2 may be employed. Alternatively, mixed $C_4$–$C_5$ hydrocarbons such as olefin- and/or paraffin-containing refinery streams boiling in the range of about −10° C. to 40° C., and containing at least 5 to 10 percent isobutene and 0 to 20 percent butene-2, by weight, may also be employed as starting materials. One typical $C_4$–$C_5$ refinery stream which may thus be employed is made up of a hydrocarbon mixture comprising two or more of the compounds isobutene, isobutane, n-butene-1, n-butene, trans-butene-2, cis-butene-2, isopentane, isopentene and the like. Thus, as a further advantage of this process, it has been found that the starting material need not be restricted to pure isobutene or butene-2, but rather a mixture of $C_4$–$C_5$ hydrocarbons containing isobutene and/or butene-2 as well as other olefins and/or paraffins may be utilized. In such a case the methylal selectively reacts with the isobutene or butene-2 while the remaining olefins and paraffins present merely act as non-reactive diluents which do not hinder the reaction.

As described above, the catalyst employed in this process is boron phosphate. This catalyst may be conveniently regenerated by heating it at high temperatures sufficient to burn off any residual coke, and reused.

As taught in the aforementioned Japanese Pat. 19,082, the 4-methoxy-2-methylbutene-1, i.e. the isoprene precursor, which is co-produced with isoprene, is readily convertible to isoprene, and thus may be separated and recycled with the starting materials in order to increase the overall yield. Alternatively, and more advantageously, however, it has been found, as a further embodiment of this invention, that when a co-catalyst comprising copper phosphate or lead, magnesium, or barium sulfate is employed together with the boron phosphate, the relatively small amounts of this precursor which are formed by this process are reduced even more. British Pat. No. 673,547 teaches a similar reaction using metal salts in the presence of alumina. However, this reference makes no teaching or suggestion of the use of boron phosphate in this reaction, or the use of this type of catalyst system in the reaction of methylal with isobutene to form isoprene.

The ratio of boron phosphate to co-catalyst should desirably be in the range of about 1 to 25 percent by weight of co-catalyst based on the total weight of the catalyst mixture, and preferably about 2 to 8 percent by weight.

This invention will now be illustrated by the following examples. In considering these examples, a comparison of the results obtained in Example 1, which employs the catalyst taught by the Japanese patent, with the results obtained in Example 2, which employs applicant's catalyst, will clearly demonstrate the superiority of the latter over the former with respect to catalyst life and selectivity for the desired isoprene.

EXAMPLE 1

Into a vertical Pyrex tube fitted with an electric heater and containing 4 cc. of silica gel catalyst, is introduced methylal through a syringe pump and isobutene controlled through a flow meter. The reaction is carried out with an isobutene:methylal ratio of 15:1 at 300° C. The isobutene is introduced at a rate of 25 liquid cc./hr. and the methylal is introduced at a rate of 1.5 cc./hr. over the 4.0 cc. of silica gel catalyst (LHSV=6.6; MHSV=80). The results obtained by this reaction are as follows:

| Time (min.): | Conv. of methylal (percent) | Selectivity of isoprene (percent) | Selectivity to 4-methoxy-2-methylbutene-1 (percent) |
|---|---|---|---|
| 15 | 85 | 63 | 17 |
| 30 | 40 | 40 | 40 |

EXAMPLE 2

In accordance with the procedures of Example 1, the reaction is carried out with an isobutene:methylal ratio of 8:1 at 300° C. The isobutene is introduced at a rate of 24 liq. cc./hr. and the methylal at 2.8 cc./hr. over 4.0 cc. of boron phosphate (LHSV=7). The results obtained by this reaction are as follows:

| Time (min.): | Conv. of methylal (percent) | Selectivity of isoprene (percent) | Selectivity to 4-methoxy-2-methylbutene-1 (percent) |
|---|---|---|---|
| 2 | 99 | 75 | 5 |
| 5 | 99 | 67 | 9 |
| 8 | 86 | 61 | 14 |

EXAMPLE 3

In accordance with the procedure of Example 2, isobutene and methylal are passed over 4.0 cc. boron phosphate at rates of 24 liq. cc./hr. and 1.5 cc./hr., respectively. (Mole ratio of isobutene:methylal=15 and LHSV of 6.6.) The results are:

| Time (hr.): | Conv. of methylal (percent) | Selectivity of isoprene (percent) | Selectivity to 4-methoxy-2-methylbutene-1 (percent) |
|---|---|---|---|
| 2 | 99 | 81 | 1 |
| 5 | 99 | 76 | 6 |
| 10 | 93 | 72 | 10 |

EXAMPLE 4

In accordance with the procedures of Example 2, 24 cc./hr. of isobutene and 2.8 cc./hr. of methylal are passed over a catalyst comprising boron phosphate and an additional 5 percent by weight of $MgSO_4$.

After 9 hours, the conversion of methylal is 97 percent and the selectivity to isoprene and 4-methoxy-2-methylbutene-1 are 78 percent and 3 percent, respectively.

EXAMPLE 5

In accordance with the procedures of Example 2, the hydrocarbon feed consisting of 50 percent isobutene and 50 percent isobutane is added at a rate of 24 cc./hr. and the methylal at a rate of 1.5 cc./hr. (Mole ratio of isobutene to methylal was 8.)

After 10 hours, the conversion of methylal is 90 percent and the selectivity to isoprene and 4-methoxy-2-methylbutene-1 is 66 percent and 16 percent, respectively.

EXAMPLE 6

In accordance with the procedures of Example 2, but substituting butene-2 for isobutene, 1.5 cc./hr. of methylal and 24 liq. cc./hr. of butene-2 are passed over 4 cc. of boron phosphate (LHSV=6.6; mole ratio of butene-2:methylbutene-1 is 53 percent.

What is claimed is:

1. In a process for the production of isoprene by the vapor phase reaction of methylal with isobutene, butene-2, or mixtures thereof, in the presence of a solid catalyst, the improvement which comprises employing as the catalyst boron phosphate.

2. The process according to claim 1 wherein a $C_4$–$C_5$ olefin-paraffin hydrocarbon mixture containing at least 5 percent by weight of isobutene and from 0 to 20 percent of butene-2 is reacted with the methylal.

3. The process according to claim 1 wherein methylal and isobutene are passed over the catalyst at a liquid hourly space velocity of from about 0.1 to 25.0.

4. The process according to claim 3 wherein the liquid hourly space velocity is from about 1.0 to 10.0.

5. The process according to claim 1 wherein the mole ratio of isobutene to methylal is in the range of from about 2 to 20.

6. The process according to claim 5 wherein the mole ratio is from about 6 to 12.

7. The process according to claim 1 wherein the reaction is carried out in the presence of a co-catalyst comprising $MgSO_4$, $BaSO_4$, $PbSO_4$ or $Cu(PO_4)_2$.

8. The process according to claim 7 wherein said co-catalyst is present in amounts of from about 1 to 25 weight percent based on the weight of the total catalyst mixture.

9. The process according to claim 8 wherein 2 to 8 weight percent of said co-catalyst is employed.

References Cited
UNITED STATES PATENTS

| 2,997,509 | 8/1961 | Wirth | 260—681 |
| 2,350,485 | 6/1944 | Arundale et al. | 260—681 |
| 2,561,483 | 7/1951 | Seon et al. | 260—681 |
| 3,663,642 | 5/1972 | Rosenthal et al. | 260—681 |

DELBERT E. GANTZ, Primary Examiner

C. E. SPRESSER, Jr., Assistant Examiner